(12) United States Patent
Groves et al.

(10) Patent No.: US 9,541,670 B2
(45) Date of Patent: Jan. 10, 2017

(54) IN-SITU DOWNHOLE X-RAY CORE ANALYSIS SYSTEM

(75) Inventors: Joel L. Groves, Leonia, NJ (US); Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 315 days.

(21) Appl. No.: 13/881,680

(22) PCT Filed: Oct. 28, 2011

(86) PCT No.: PCT/US2011/058367
§ 371 (c)(1),
(2), (4) Date: Aug. 5, 2013

(87) PCT Pub. No.: WO2012/058579
PCT Pub. Date: May 3, 2012

(65) Prior Publication Data
US 2013/0308753 A1 Nov. 21, 2013

Related U.S. Application Data

(60) Provisional application No. 61/407,786, filed on Oct. 28, 2010.

(51) Int. Cl.
*G01V 5/12* (2006.01)
*E21B 49/06* (2006.01)
*G01T 7/00* (2006.01)

(52) U.S. Cl.
CPC ............... *G01V 5/12* (2013.01); *E21B 49/06* (2013.01); *G01T 7/005* (2013.01)

(58) Field of Classification Search
CPC ........ G01N 23/02; G01N 23/06; G01N 23/08; G01N 23/083; G01N 23/087; G01N 23/12; G01N 23/125; G01N 2223/303; G01N 2223/426; G01N 2223/60; G01N 2223/616; G01N 2223/66; G01V 5/08; G01V 5/12; G01V 5/125; E21B 25/00; E21B 47/00; E21B 49/00; E21B 49/06
(Continued)

(56) References Cited

U.S. PATENT DOCUMENTS 4,623,792 A * 11/1986 Bohme ................. G01N 23/00
250/255
5,310,013 A 5/1994 Kishino et al.
(Continued)

FOREIGN PATENT DOCUMENTS

GB 2179230 A 2/1987
WO 2009042774 A2 4/2009
(Continued)

OTHER PUBLICATIONS

International Search Report for PCT Application Serial No. PCT/US2011/058367 dated Jun. 19, 2012.

*Primary Examiner* — David E Smith
(74) *Attorney, Agent, or Firm* — Kenneth L. Kincaid (57) ABSTRACT

The disclosure includes an arrangement of X-ray generator(s) (210), X-ray detector(s) (214), and/or X-ray calibration device(s) for performing X-ray measurements, such as attenuation and/or photo electric factor measurements, on formation core samples (204) in a downhole environment under conditions including limited space and operations at high pressure and temperature.

23 Claims, 4 Drawing Sheets

(58) Field of Classification Search
USPC .......................... 378/51, 54, 55; 175/40, 50
See application file for complete search history.

(56) References Cited

U.S. PATENT DOCUMENTS

| | | | |
|---|---|---|---|
| 5,680,431 A | 10/1997 | Pietras, III et al. | |
| 5,910,654 A * | 6/1999 | Becker | G01V 5/12 |
| | | | 250/267 |
| 5,984,023 A | 11/1999 | Sharma et al. | |
| 6,003,620 A | 12/1999 | Sharma et al. | |
| 6,220,371 B1 * | 4/2001 | Sharma | E21B 25/00 |
| | | | 175/40 |
| 6,275,563 B1 * | 8/2001 | Griffin, Jr. | G01N 23/06 |
| | | | 378/58 |
| 6,876,721 B2 * | 4/2005 | Siddiqui | G01N 23/046 |
| | | | 250/269.3 |
| 7,321,123 B2 | 1/2008 | Simonetti et al. | |
| 7,500,388 B2 * | 3/2009 | Fujisawa | E21B 49/06 |
| | | | 73/152.11 |
| 7,507,952 B2 | 3/2009 | Groves et al. | |
| 2007/0137894 A1 | 6/2007 | Fujisawa et al. | |
| 2008/0152080 A1 | 6/2008 | Shampine et al. | |
| 2009/0107724 A1 | 4/2009 | Utter et al. | |
| 2009/0114447 A1 * | 5/2009 | Reid, Jr. | E21B 25/00 |
| | | | 175/58 |
| 2009/0161823 A1 * | 6/2009 | Groves | G01N 33/2847 |
| | | | 378/53 |
| 2009/0274276 A1 * | 11/2009 | Wraight | H01J 35/06 |
| | | | 378/89 |
| 2010/0270472 A1 * | 10/2010 | Proksa | G01T 1/171 |
| | | | 250/371 |
| 2011/0049345 A1 * | 3/2011 | Roberts | G01V 5/12 |
| | | | 250/269.6 |
| 2011/0174543 A1 * | 7/2011 | Walkingshaw | E21B 49/06 |
| | | | 175/58 |
| 2011/0247881 A1 * | 10/2011 | Orban | E21B 7/061 |
| | | | 175/244 |

FOREIGN PATENT DOCUMENTS

| | | |
|---|---|---|
| WO | 2009042781 A2 | 4/2009 |
| WO | 2009042785 A2 | 4/2009 |

* cited by examiner

IN-SITU DOWNHOLE X-RAY CORE ANALYSIS SYSTEM

BACKGROUND OF THE DISCLOSURE

Some downhole tools include one or more devices that perform core analysis of subterranean formations. The core analysis may measure the chemical or physical properties of a core extracted from the subterranean formations. Various systems perform the core analysis such as systems employing radioisotopic sources. The radioisotopic sources, however, may be subject to special handling and regulations. Other sources, by comparison, are relatively safe and not subject to strict regulations. Thus, core analysis systems performing measurements on formation cores in a coring tool lowered in a wellbore can provide the wanted properties without introducing the safety concerns.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Many apparatuses and techniques are known for core analysis in the oilfield industry. For example, U.S. Pat. Nos. 5,984,023; 6,003,620 and 6,220,371, disclose method and apparatus for real time in-situ measuring of the downhole chemical and or physical properties of a core of an earth formation during a coring operation. A downhole apparatus is coupled to an inner and/or an outer core barrel near the coring bits with a sensor array coupled to the inner core barrel for real time gathering of the measurements. A controller coupled to the sensor array controls the gathering of the measurements and stores the measurements in a measurement storage unit coupled to the controller for retrieval by a computing device for tomographic analysis. Electromagnetic, acoustic, fluid and differential pressure, temperature, gamma and X-ray, neutron radiation, nuclear magnetic resonance, and mud water invasion measurements may be used to measure the chemical and or physical properties of the core that may include porosity, bulk density, mineralogy, and fluid saturations.

U.S. Pat. No. 7,500,388, discloses a wireline-conveyed side-wall core coring tool for acquiring side-wall core from a geological formation for performing in-situ side-wall core analysis. The coring tool has a core analysis unit operable to measure geophysical properties of an acquired side-wall core. The measured geophysical properties may be used to determine the success of the acquisition of side-wall cores by the coring tool. The core analysis unit is operable of performing an in-situ interpretation of measured geophysical property of the side-wall core and transmitting in near real-time the measurements or the interpretation results to surface data acquisition and processing apparatus.

PCT Patent Application Nos. WO2009042774, WO2009042781 and WO2009042785, disclose an apparatus including a chamber to receive a core at a receiving end of the chamber and a cutting device to cut the core at a location distal from the receiving end of the core chamber. A disclosed method of coring includes drilling into the formation to retrieve a core, receiving the core into a chamber at an open end of a chamber, and cutting the core up hole of the open end of the chamber so as to continue to receive the core into the chamber as the drilling continues. A disclosed method for estimating a property downhole includes receiving a core at a receiving end of a downhole tool while removing a portion of the received core distal from the receiving end of the tool, obtaining measurements by a sensor downhole, and processing the measurements to estimate the property of interest.

As mentioned above, various systems involve the use of radioisotopic sources for downhole analysis of cores obtained via methods described supra. The use of radioisotopic sources in logging or core analysis tools has, however, several drawbacks. For example, radioisotopic sources in downhole tools may use special handling when the radioisotopic sources are inserted into or removed from the downhole tool. Additionally, these radioisotopic sources may use additional shielding during transportation and storage, as well as additional security during such transportation and storage. Indeed, in many countries, even very-low-strength radiation sources (e.g., $10^{-6}$ curie ("Ci")) may be considered radioisotopic sources subject to burdensome regulations. X-ray sources, by comparison, are relatively safe and not subject to strict regulations.

For example, U.S. Pat. No. 5,680,431, discloses an X-ray generator including a light source; a high temperature photocathode arranged so as to be illuminated by light from the light source; an accelerator for accelerating electrons emitted by the photocathode; and a target onto which accelerated electrons impinge so as to produce X-rays, the target being held at substantially ground potential. The accelerator is arranged so that the photocathode is at a high negative voltage end of a voltage multiplier (e.g., held at about −100 kilovolts ("kV")) and the target is at ground potential. The voltage multiplier can include a bank of nested tubular capacitor members which surround the photocathode and accelerator section and are arranged such that the outer surface is at ground potential, the same as the target.

The disclosure includes an arrangement of X-ray generator(s), X-ray detector(s), and/or X-ray calibration device(s) capable of performing X-ray measurements, such as attenuation and/or photo electric factor ("Pe") measurements, on formation cores in a downhole environment under conditions including limited space and operations at high pressure and temperature. In an embodiment, a core acquisition and measurement tool may include a high voltage X-ray generator parallel to the tool housing's longitudinal axis to emit an X-ray beam about perpendicular to the tool housing longitudinal axis. The tool may include a measurement X-ray detector in positional agreement with the X-ray beam and spaced apart from the X-ray generator. The tool may also include a feature (or means) for admitting a formation core in the tool housing between the X-ray generator and the measurement X-ray detector.

Optional calibrations devices may be provided. The calibration devices may improve measurement precision and stability, especially in wellbores having considerable temperature gradients. For example, a reference X-ray detector may be implemented in alignment with the X-ray generator. The electron target and/or collimator of the X-ray generator may generate an X-ray beam about perpendicular to the tool housing longitudinal axis and a reference X-ray beam along the X-ray generator. Also, the core acquisition and measurement tool may include a feature (or means) for providing a calibration block between the X-ray generator and the measurement X-ray detector.

Optional features (or means) for providing a computed tomographic image of the formation core may also be provided. Tomographic images may be used to estimate the core quality (e.g., detect core fractures, inclusions, anisotropy directions, etc.). For example, a ball screw piston may be provided to translate the core between the X-ray generator and the measurement X-ray detector. Additionally, a rotation mechanism may be provided to rotate the core between the X-ray generator and the measurement X-ray detector. Further, the X-ray generator and/or the measurement detector may be located at each of a plurality of positions with respect to the analyzed core. The X-ray core analysis system described herein may be used in "wireline", "on pipe", and/or "while-drilling" embodiments, however, the description here treats wireline embodiments.

Figure 1:
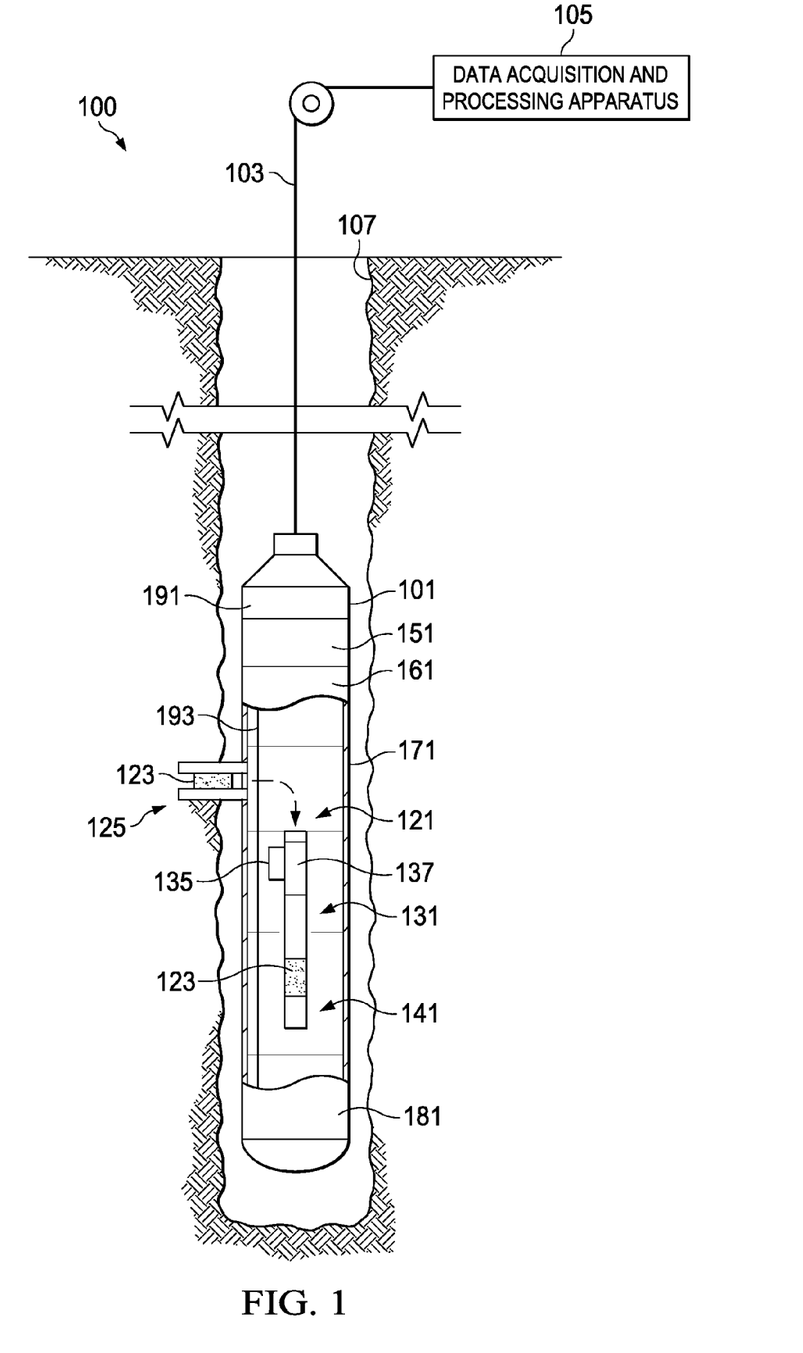
FIG. 1 shows a diagram of a wireline logging system including a tool string with a side-wall coring tool, in accordance with various embodiments of the present disclosure.

Referring now to FIG. 1, a diagram is shown of a wireline logging system 100 including a tool string 101. A side-wall coring tool 171 is part of the tool string 101 as well as other tools 151, 161, 181. A wireline 103 connects the tools in the tool string 101 to a data acquisition and processing apparatus 105 on the surface. The wireline 103 supplies power to the tools in the tool string 101. Furthermore, the wireline 103 provides a communication medium to send signals to the tools and to receive data from the tools. For example, the tools 151, 161, 171, 181 are connected via a tool bus 193 to a telemetry unit 191, which in turn is connected to the wireline 103 for receiving and transmitting data and control signals between the tools 151, 161, 171, 181, and the surface data acquisition and processing apparatus 105.

The tool string 101 is commonly lowered into a well borehole or wellbore 107 to obtain measurements of geophysical properties for the area surrounding the borehole 107, in which case, the tools 151, 161, 171, 181 may contain sensors for taking geophysical measurements. For example, the tools 151, 161, 171, 181 are lowered in the borehole 107 and are then retrieved by reeling-in by the data acquisition and processing apparatus 105. As the tools are retrieved from the well borehole 107, the tools collect and send data via the wireline 103 about the geological formation through which the tools 151, 161, 171, 181 pass, to the data acquisition and processing apparatus 105 at the surface, contained inside a logging truck or a logging unit (not shown). The data may also be acquired while the tool string 101 is lowered into the well borehole 107.

Figure 2:
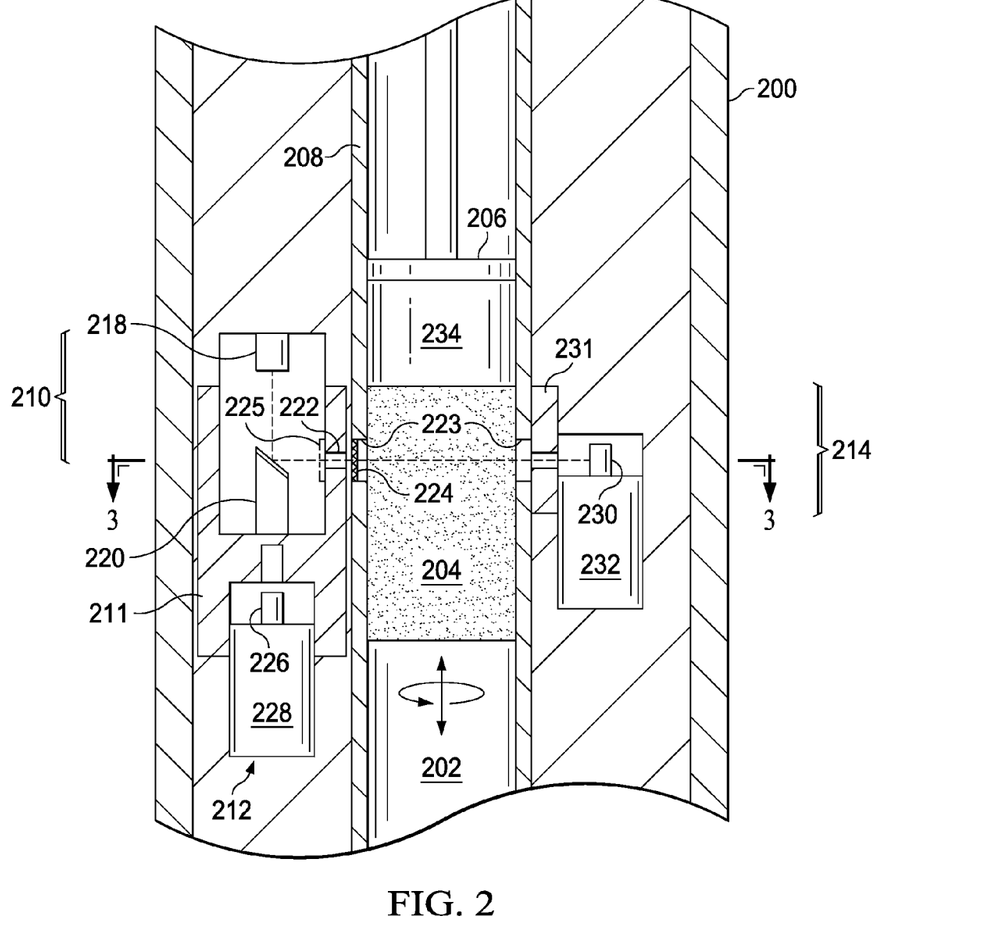
FIG. 2 shows a detailed blow-up of the core analysis section of the wireline logging system of FIG. 1, in accordance with various embodiments of the present disclosure.

For the sake of clarity, the detail of the side-wall coring tool 171 is illustrated in FIG. 1, whereas the detail of the other tools in the string is not shown. The side-wall coring tool 171 may comprise at least one mechanical coring section 121, at least one core analysis section 131, and at least one core storage section 141. The side-wall coring tool 171 is operable to acquire multiple side-wall core samples during a single trip to the borehole 107. When the side-wall coring tool 171 is located at a depth of interest 125 in the borehole 107 (i.e., the tool string 101 is stationary), the mechanical coring section 121 acquires a side-wall core 123 from the geological formation. The mechanical coring section 121 may enclose the acquired side-wall core 123 in a protective canister 137 and convey the protective canister 137 containing the side-wall core 123 to the core analysis section 131. The core analysis section 131 comprises an X-ray core analysis system 135. The X-ray core analysis system 135 is connected via the tool bus 193 to the telemetry unit 191 for transmission of data to the data acquisition and processing apparatus 105 at the surface via the wireline 103. After analysis of the acquired side-wall core 123 is completed (which may be performed while the tool string 101 is stationary or moving), the core analysis section 131 conveys the acquired side-wall core 123 to the core storage section 141 of the side-wall coring tool 171. Furthermore, the acquired side-wall cores 123 are stored in the core storage section 141 of the side-coring tool 171 for retrieval when the tool string 101 is reeled to surface from the borehole 107. One example implementation of the side-wall coring tool 171 may be found in U.S. Patent Application Publication No. 2009/0114447. FIG. 2 shows in more detail a portion of the core analysis section 131 of FIG. 1. The longitudinal axis of the side-wall coring tool 171 of FIG. 1 is depicted vertically. A tool housing 200 comprises a core passageway 202 between the mechanical coring section 121 and the core storage section 141. A core sample 204 (optionally placed in a canister, such as described in U.S. Pat. No. 7,500,388) can be translated along the core passageway 202 by extending a piston 206, such as a ball screw piston. The piston 206 is used to precisely move the core sample 204 and the canister in the core passageway 202 and to measure (for example, by counting the revolutions of a motor driving the piston 206 using a resolver coupled to the motor) the position of the core sample 204.

The X-ray core analysis system 135 of FIG. 1, referring now to the detailed FIG. 2, comprises a first pressure housing 208 about the core passageway 202, an X-ray generator (e.g., an X-ray tube) 210, a reference detector 212, and a measurement detector (or X-ray detector) 214. An X-ray shielding material 211 is about a portion of the X-ray generator 210 and the reference detector 212. The diameter of the core sample 204 is, for instance, on the order of 1.5 inches in diameter and 3 inches long. The X-ray generator 210 is of the order of 1.5 inches in diameter. The tool housing 200 diameter is configured for conveyance in most boreholes, and is on the order of 5 inches in diameter.

The X-ray generator 210, coupled to a high voltage supply (not shown), includes a cathode 218 generating an electron beam, an accelerating gap for the acceleration of the electrons of the electron beam, and an anode 220 on which the X-rays are generated by the electrons impinging on it. X-ray generation at the anode 220 may occur through Bremsstrahlung and inner shell excitation.

In one example embodiment, the accelerating electrodes are at a potential difference up to 200 kV, and may be less than 100 kV such as 80 kV. In the embodiment shown in FIG. 2, the anode 220 emits a flux of X-rays along the plane perpendicular to the electron beam direction. In some embodiments, the anode 220 may comprise a thin disk, tilted by 30 to 45 degrees with respect to the plane perpendicular to the electron beam. Further, a beam collimator 222 may be used to collimate the generated X-rays along an axis traversing the core sample 204. The passage of the X-ray beam may optionally be improved in that an X-ray window(s) 223 of low density material (e.g., beryllium, aluminum, titanium) may be provided to afford reduced x-ray attenuation while offering proper pressure sealing at the first pressure housing 208 about the core sample 204 and, therefore, limiting the number of X-rays blocked from passage to the core sample 204. Instead of providing a low attenuation window in the pressure housing, the first pressure housing 208 surrounding the core sample 204 may comprise high strength titanium and include an (axial) hole drilled to accept the core sample 204, which is at well borehole pressure. Titanium offers lower X-ray attenuation compared to the stainless steel used for pressure housings.

A relatively small portion of the X-rays may be used (employed) by the reference detector 212. The reference detector 212 is used, in various embodiments, as an X-ray monitor to count the emitted X-rays. The counts can be used, for example, to adjust the operating voltage of the X-ray generator 210, and to insure a stable flux and spectrum of emitted X-rays towards the core sample 204, or to account for variations thereof during later processing. One example implementation of the reference detector 212, or monitor, can be found in U.S. Pat. No. 7,321,123. The reference detector 212 includes a scintillation crystal 226, and photomultiplier tube ("PMT") 228 for obtaining the above-referenced counts according to various methods.

A measurement detector 214, similar in mechanics and function to the reference detector 212, is provided facing the X-ray generator 210 on the opposite side of the core sample 204. The measurement detector 214 also comprises a scintillation crystal 230 and a photomultiplier tube ("PMT") 232. Electronics (not shown), coupled to the measurement detector 214, bin and tally current pulses generated by the PMT 232 as a function of the energy deposited in the measurement detector 214. The tallies in one or more bins can be used to determine a core density averaged over the path of the X-ray beam, and optionally a photo electric factor ("Pe") averaged over the path of the X-ray beam. For example, an empirical model derived from laboratory data obtained with a core having known density and photo electric factor may be used to determine the core density averaged over the path of the X-ray beam, and optionally the photo electric factor averaged over the path of the X-ray beam.

As illustrated in FIG. 2, the piston 206 may be optionally provided with a calibration plug 234 (e.g., comprising aluminum) affixed thereto. As the piston 206 advances, the calibration plug 234 occupies a majority portion of the core passageway 202 between the X-ray generator 210 and the measurement detector 214. Thus, the tallies in one or more bins corresponding to the density and photo electric factor of the calibration plug or block are measured. The measurement of the tallies with the calibration plug 234 in place allows a calibration of the system with respect to the photo electric factor and density, as the photo electric factor and density of the calibration plug 234 are known. This allows a calibration of the system for the measurement of an accurate photo electric factor and density to account for tool-to-tool variations in the X-ray response. The differences between these measurements and expected values can also be used to adjust the operating voltage of the X-ray generator 210 and/or electron current from the cathode 218 to allow a stable flux and spectrum of emitted X-rays.

Figure 3:
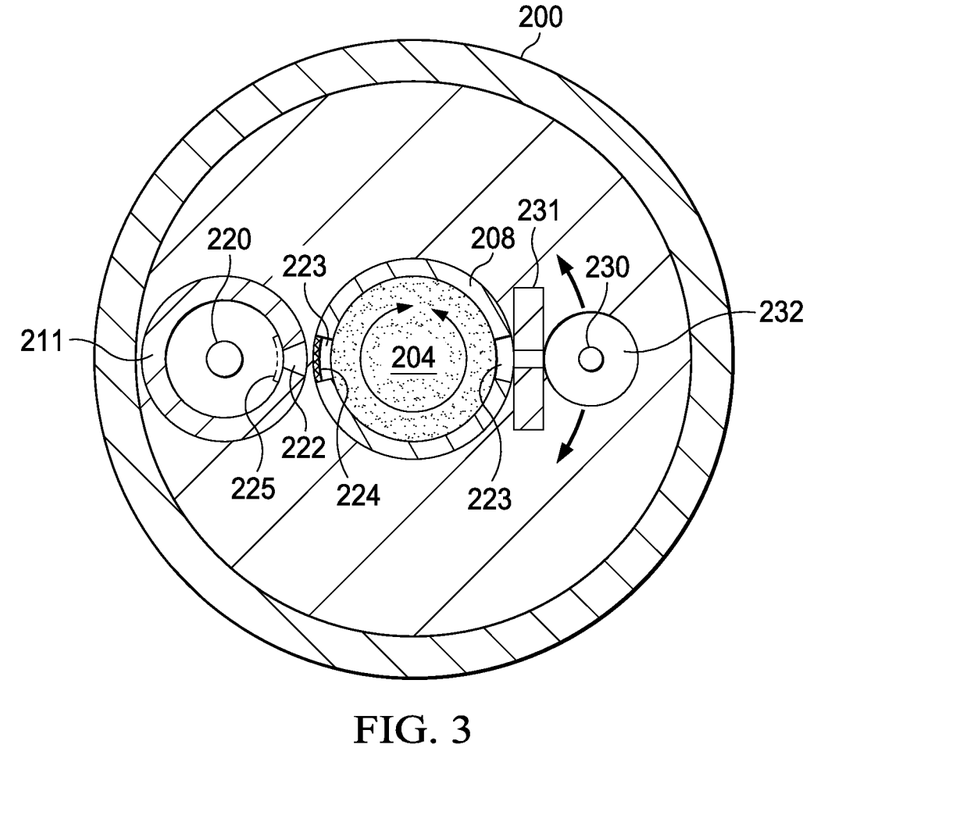
FIG. 3 shows a cross section of FIG. 2 viewed from above, in accordance with various embodiments of the present disclosure.

FIG. 3 shows a cross section of FIG. 2 viewed from above. The core sample 204 can be rotated to different azimuthal angles, as well as moved axially (i.e., perpendicular to the plane of FIG. 3). In addition, the measurement detector 214 with its detector collimator 231 can be moved to several angular positions with respect to the axis of the core sample 204. The variety of angles available makes it possible to generate an image of the core density in three dimensions. It should be understood that instead of moving the measurement detector 214 (and accompanying detector collimator 231), the X-ray generator 210 (and accompanying beam collimator 222) could likewise be moved azimuthally or laterally. In addition, both the measurement detector 214 and the X-ray generator 210 may be moved laterally to scan the core sample 204.

The image generated of the core density can be used to detect defects downhole, and estimate the core quality therefrom (e.g., estimate if the captured core sample 204 will be usable in a surface laboratory for a more complete investigation of the formation properties). If the core quality is too low, another core sample 204 from the same formation may be obtained while the coring tool is still downhole. It is also possible to eject bad cores in order to use the limited core storage in the tool solely for good cores.

Figure 4:
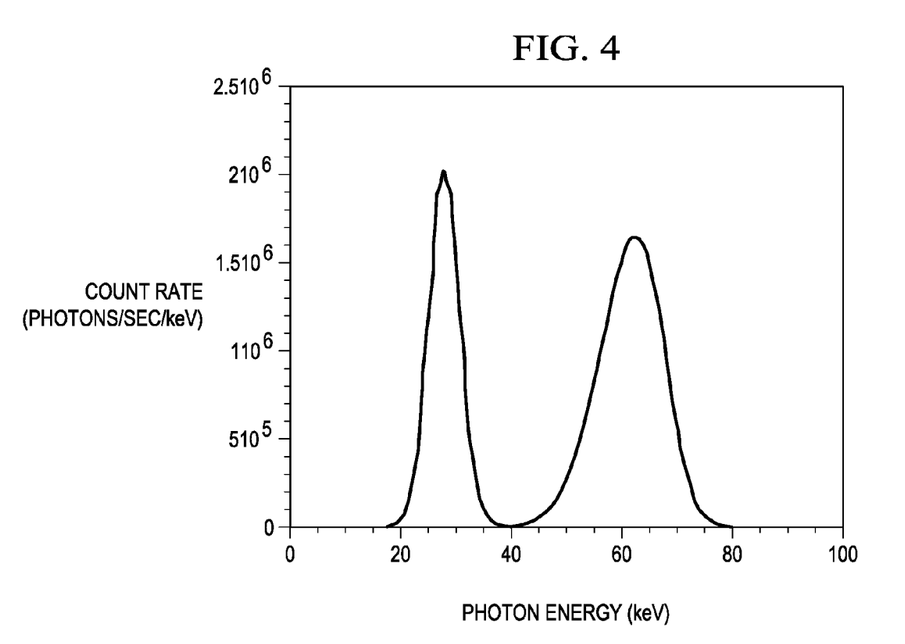
FIG. 4 shows a plot of Bremsstrahlung radiation emitted by the X-ray generator, shaped into a two-peak spectrum using a filter, in accordance with various embodiments of the present disclosure.

In an example, the X-ray generator 210 is operated at 80 kV potential difference. The anode 220 comprises a tungsten target. One of the window(s) 223 described previously may comprise a filter 224 of a high density or high Z material (e.g., a 1000 micron tin ("Sn") filter) that will reduce the number of transmitted low energy X-rays. In lieu thereof or in addition thereto, the filter may be located within the X-ray generator 210 (illustrated as a filter 225) and/or within the beam collimator 222 (not shown) and/or between the beam collimator 222 and the window 223 (not shown). The Bremsstrahlung radiation from the X-ray generator 210 is shaped into a two-peak spectrum using the filter 224, as shown in FIG. 4. FIG. 4 shows a plot of the radiation from the X-ray generator 210 using a 1000 micron Sn filter in a 10 mil aluminum window and operated at 80 kV potential difference and 0.001 milliamperes ("mA") electron current. The measurement detector 214 (and accompanying electronics not shown) measures a high energy count, corresponding to the X-ray photons having energy between 40 and 80 kilo electronvolts ("keV"), and a low energy count, corresponding to the X-ray photons having energy between 20 and 40 keV. Both counts can be used to determine average density and Pe, or optionally images of density and Pe.

The X-ray core analysis system 135 disclosed herein is not limited to side-wall coring configurations, such as depicted in FIG. 1. For example, the X-ray core analysis system 135 may be used in an in-line coring technique, such as depicted in U.S. Patent Application Publication No. 2009/0107724.

In an embodiment, a calibration plug or block 234 may be provided affixed to the bottom of the protective canisters 137 shown in FIG. 1. In an embodiment, the X-ray generator 210 may optionally be provided with the beam collimator 222 to focus a plurality of X-beams along different paths, as shown for example in U.S. Patent Application Publication No. 2008/0152080, and accordingly, a plurality of measurement detectors 214 may be provided in positional agreement with the different paths.

In an embodiment, the X-ray detector 214 may comprise a one-dimensional or two dimensional imaging detector subtending an azimuthal and/or axial angle. This allows a faster acquisition of the data for a 3-D image.

The X-ray core analysis system described here exhibits one or more of the following attributes. Radiation is emitted when high voltage is applied to the X-ray generator. Thus, the extensive safety regulations related to owning, handling, storage and shipment of radioactive materials are moot with respect to X-ray systems.

The radiation flux emitted from an X-ray generator can be much higher from an X-ray generator than from gamma-ray sources that are practical for use in the oilfield. Thus, high accuracy measurements can be made much more quickly (in the range of around one second). Further, the radiation flux emitted from an X-ray generator can be tightly collimated such that high spatial resolution density and photo electric factor scanning measurements (tomography) can be performed on the core samples.

The shielding for the X-ray core analysis system is easier than for a gamma-ray system since there are no high energy (>100 keV) photons emitted by the X-ray system, whereas, the candidate radioactive sources (137 caesium ("Cs") and 133 barium ("Ba")) for the gamma-ray system have high-energy gamma-rays that are difficult to shield. Therefore, the space constraints to implement the X-ray core analysis system in a downhole environment may be respected.

The configuration of the X-ray generator is also tailored to respect space constraints of the downhole environment, so that X-ray core analysis may be performed in-situ, and substantially in real time, that is, without withdrawing the tool to the surface for analysis.

Core scanning may be used to detect core defects and estimate a core quality. Core quality is a parameter to determine in-situ, as additional core samples may be captured in the same formation if the quality of the core sample is deemed insufficient without tripping the coring tool out of the well borehole. Thus, coring operation is meaningfully expedited.

Thus, a downhole coring analysis system has been introduced herein. In one embodiment, the coring analysis system comprises a downhole tool housing for disposition in a wellbore, a mechanical coring section to obtain a core sample from the wellbore, a pressure housing (disposed inside the downhole tool housing) having a through-passageway adapted for passage of a core sample therethrough, and a piston operable to convey a core sample through the through-passageway in a controllable manner. The coring analysis system also comprises an X-ray generator (positioned within the downhole tool housing in a first position) to emit an X-ray beam substantially perpendicular to a longitudinal axis of the downhole tool housing and through a core sample positioned in the through-passageway. The coring analysis system also comprises an X-ray detector (positioned within the downhole tool housing in a second position that is positionally aligned with the X-ray generator) operable to count current pulses to determine one of a core density averaged over the path of the X-ray beam and a photo electric factor ("Pe") averaged over the path of the X-ray beam.

A cathode and/or anode of the X-ray generator may be coupled to a high voltage supply, wherein the cathode is separated by an acceleration gap from the anode. In accordance therewith, emission of the X-ray beam at the anode may occur through one of Bremsstrahlung and inner shell excitation. The X-ray generator may also comprise a collimator operable to direct the emitted X-ray beam along an axis traversing the core sample. The X-ray generator may also comprise a filter (e.g., formed from a high density and/or high Z material such as tin or silver) to convert the X-ray beam into at least a two peak spectrum, and a feature (or means) of feedback to control voltage at the high voltage supply based on a ratio of the two peaks of the spectrum.

The X-ray generator may also emit X-rays axially along the core analysis system, which can be used as a reference beam. In accordance therewith, the core analysis system may further comprise an X-ray monitor (a reference detector) comprising a scintillator crystal and a photomultiplier positioned to count electrons emitted from the X-ray generator in the reference X-ray beam. The count from the X-ray monitor may be used to adjust the operating voltage of the X-ray generator, insure a stable flux and spectrum of emitted X-rays towards the core sample, and/or account for variations in flux or spectrum of emitted X-rays during subsequent surface processing.

The core analysis system may also comprise an X-ray shielding material (positioned about portions of the X-ray generator) to limit the amount of radiation that is not directed to the sample or the reference detector (if present). The piston of the core analysis system may be coupled to a calibration plug (e.g., aluminum) such that the difference between actual counts and expected values of the counts is used to adjust the operating voltage of the X-ray generator and/or electron current from the cathode, in the absence of a reference detector. In the presence of a reference detector, the calibration plug may serve as a calibration reference to enhance the accuracy of the core analysis system by allowing a direct reference measurement of a material of known composition and density. Such a measurement can be done at surface (at the well site or in the shop) to test and calibrate the tool and/or when the tool is in the wellbore to obtain a direct calibration under downhole conditions. The piston is operable to translate the core sample axially along the system and/or rotate the core sample in the through-passageway. The piston and control electronics coupled thereto may measure the position of the core sample in the through-passageway by, for instance, counting the revolutions of a motor driving the piston.

A method for X-ray based downhole coring analysis has been introduced herein. In one embodiment, the method comprises disposing a downhole coring analysis system in a wellbore including a tool housing (with a through-passage) adapted for wellbore environments. The method also comprises obtaining a core sample from the wellbore via, for instance, side-wall or inline coring. The method also comprises conveying the core sample through the through-passageway in a controllable manner, emitting an X-ray beam (from an X-ray generator) substantially perpendicular to a longitudinal axis of the downhole tool housing and through the core sample, detecting the X-ray beam (at an X-ray detector), and counting current pulses generated by such detection to generate an image of core density.

The method also comprises using the image to detect a downhole defect prior to tripping the coring analysis system out of the wellbore. Upon detection of a downhole defect, the method also comprises obtaining at least one additional core sample from the formation in an area proximate the location of the core sample imaged to reveal the defect. The method also comprises rotating the core sample to a plurality of different azimuthal angles, and emitting and detecting the X-ray beam traversing the core sample for each azimuthal angle and/or each axial location. The method may also include moving the X-ray generator and a collimator (and/or the X-ray detector and a collimator) to a plurality of angular positions with respect to the axis of the core sample in order to generate an image of the core density in three dimensions. The method may also include filtering the X-ray beam into at least a two peak spectrum with a filter (e.g., formed from one or more of a high density and/or high Z material).

As described herein, an apparatus, in one embodiment, comprises a coring tool to obtain a core sample from a geological formation, an X-ray generator to emit an X-ray beam substantially perpendicular to a longitudinal axis of the core sample, and an X-ray detector to detect the X-ray beam through the core sample to determine a characteristic of the core sample. The apparatus may also comprise a piston to convey the core sample through a passageway within the coring tool. The piston may be coupled to a calibration plug such that count rates determined in the presence of the calibration plug provide a reference or calibration for measurement in the presence of the core sample. The piston is also operable to rotate the core sample in the passageway. In an embodiment, the characteristic is core density and the X-ray detector counts current pulses in one or more energy bins representing an energy of the pulses to determine the core density averaged over a path of the X-ray beam. The characteristic may also be a photo electric factor and the X-ray detector counts current pulses in one or more energy bins representing an energy of the pulses to determine the photo electric factor averaged over a path of the X-ray beam.

The X-ray generator may also comprise a collimator to direct the X-ray beam along an axis traversing the core sample. The X-ray generator may also comprise a filter, which may be part of a window, to convert the X-ray beam into at least a two-peak spectrum. The X-ray detector and a collimator may be movable with respect to the core sample. Also, a fraction of the X-ray beam may be used as a reference X-ray beam and the apparatus may further comprise a reference detector to detect the reference X-ray beam. In an embodiment, the reference beam may be emitted in a direction substantially in the direction of the axis of the X-ray generator. The reference X-ray beam may be used to adjust the high voltage of the X-ray generator and/or adjust the electron current in the X-ray generator. The apparatus may also comprises a pressure housing within the coring tool having a passageway for the core sample and at least one window in the pressure housing proximate the core sample. The at least one window may accommodate a filter as described above.

As described herein, a method of operating a coring tool, in one embodiment, comprises obtaining a core sample from a geological formation, emitting an X-ray beam substantially perpendicular to a longitudinal axis of the core sample, and detecting the X-ray beam through the core sample to determine a characteristic of the core sample. The emitting may occur through one of Bremsstrahlung and inner shell excitation. The emitting may also comprise directing the X-ray beam along an axis traversing the core sample. In one embodiment, the characteristic is core density and the detecting comprises counting current pulses in one or more energy bins separated representing an energy of the pulses to determine the core density averaged over a path of the X-ray beam. The characteristic may be a photo electric factor and the detecting comprises counting current pulses in one or more energy bins representing an energy of the pulses to determine the photo electric factor averaged over a path of the X-ray beam.

The method may also comprise conveying the core sample through a passageway within the coring tool and measuring a position of the core sample within a passageway of the coring tool. The method may also comprise conveying the core sample through a passageway within the coring tool with a piston, determining count rates in the presence of a calibration plug coupled to the piston, and providing a reference or calibration in accordance with the count rates for measurement in the presence of the core sample. The method may also comprise determining a position of the core sample by counting revolutions of a motor of a piston conveying the core sample through a passageway within the coring tool. The method may also comprise rotating the core sample in a passageway of the coring tool. The method may also comprise converting the X-ray beam into at least a two-peak spectrum. The method may also comprise employing a fraction of the X-ray beam as a reference X-ray beam, and detecting the reference X-ray beam to adjust an operating voltage and/or an electron current of the X-ray generator, thereby adjusting the energy range and/or the intensity of the emitted x-rays. The method may also comprise conveying the core sample through a passageway between a pressure housing within the coring tool and the emitting may comprise emitting the X-ray beam through at least one window in the pressure housing toward the core sample.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
    a coring tool to obtain a core sample from a geological formation;
    an X-ray generator to emit an X-ray beam substantially perpendicular to a longitudinal axis of the core sample;
    an X-ray detector to detect the X-ray beam through the core sample to determine a characteristic of the core sample, wherein the X-ray generator, the X-ray detector, or both are configured to be moved to different angular positions with respect to the longitudinal axis, azimuthally, or laterally to generate an image of the core sample in three dimensions;
    a piston to convey the core sample through a passageway within the coring tool; and
    a calibration plug affixed to a face of the piston to move through the passageway between the X-ray generator and the X-ray detector as the piston advances, wherein the calibration plug does not comprise core samples from the geological formation.

2. The apparatus as recited in claim 1, wherein the piston is coupled to the calibration plug such that count rates determined in the presence of the calibration plug provide a reference or calibration for measurement in the presence of the core sample.

3. The apparatus as recited in claim 1 wherein the characteristic is core density and the X-ray detector counts current pulses in one or more energy bins to determine the core density averaged over a path of the X-ray beam.

4. The apparatus as recited in claim 1 wherein the characteristic is a photo electric factor and the X-ray detector counts current pulses in one or more energy bins to determine the photo electric factor averaged over a path of the X-ray beam.

5. The apparatus as recited in claim 1 wherein a cathode and/or anode of the X-ray generator is coupled to a high voltage supply, wherein the cathode is separated by an acceleration gap from the anode.

6. The apparatus as recited in claim 5 wherein emission of the X-ray beam at the anode occurs through one of Bremsstrahlung and inner shell excitation.

7. The apparatus as recited in claim 1 wherein the X-ray detector and a collimator are movable with respect to the core sample.

8. The apparatus as recited in claim 1 wherein the X-ray generator comprises a filter in a window to convert the X-ray beam into at least a two-peak spectrum.

9. The apparatus as recited in claim 1 wherein a fraction of the X-ray beam is used as a reference X-ray beam and the apparatus further comprises a reference detector to detect the reference X-ray beam of the X-ray generator.

10. The apparatus of claim 9 wherein the reference X-ray beam is used to adjust the high voltage of the X-ray generator or adjust the electron current in the X-ray generator.

11. The apparatus as recited in claim 1 further comprising a pressure housing within the coring tool having a passageway for the core sample and at least one window in the pressure housing proximate the core sample.

12. The apparatus as recited in claim 1, wherein the calibration plug comprises a metal.

13. The apparatus as recited in claim 1, wherein the calibration plug comprises aluminum.

14. A method of operating a coring tool, comprising:
obtaining a core sample from a geological formation;
advancing a piston to convey the core sample and a calibration plug affixed to a face of the piston through a passageway within the coring tool, wherein the calibration plug does not comprise core samples from the geological formation;
emitting an X-ray beam substantially perpendicular to a longitudinal axis of the core sample using a X-ray generator disposed on a first side of the passageway;
detecting the X-ray beam through the core sample to determine a characteristic of the core sample using an X-ray detector disposed on a second side of the passageway: and
moving the X-ray generator, the X-ray detector, or both to different angular positions with respect to the longitudinal axis, azimuthally, or laterally to generate an image of the core sample in three dimensions.

15. The method as recited in claim 14 further comprising measuring a position of the core sample within a passageway of the coring tool.

16. The method as recited in claim 14, further comprising:
determining count rates in the presence of the calibration plug coupled to the piston; and
providing a reference or calibration in accordance with the count rates for measurement in the presence of the core sample.

17. The method as recited in claim 14 further comprising determining a position of the core sample by counting revolutions of a motor of a piston conveying the core sample through a passageway within the coring tool.

18. The method as recited in claim 14 further comprising rotating the core sample in a passageway of the coring tool.

19. The method as recited in claim 14 wherein the characteristic is core density and the detecting comprises counting current pulses in one or more energy bins to determine the core density averaged over a path of the X-ray beam.

20. The method as recited in claim 14 wherein the characteristic is a photo electric factor and the detecting comprises counting current pulses in one or more energy bins to determine the photo electric factor averaged over a path of the X-ray beam.

21. The method as recited in claim 14, further comprising:
using a fraction of the X-ray beam as a reference X-ray beam; and
detecting the reference X-ray beam to adjust an operating voltage or electron current of emitting the X-ray beam.

22. The method as recited in claim 14 further comprising conveying the core sample through a passageway between a pressure housing within the coring tool and wherein the emitting comprises emitting the X-ray beam through at least one window in the pressure housing toward the core sample.

23. An apparatus, comprising:
a coring tool to obtain a core sample from a geological formation;
a protective canister configured to enclose the core sample;
an X-ray generator to emit an X-ray beam substantially perpendicular to a longitudinal axis of the core sample enclosed in the protective canister;
an X-ray detector to detect the X-ray beam through the core sample to determine a characteristic of the core sample, wherein the X-ray generator, the X-ray detector, or both are configured to be moved to different angular positions with respect to the longitudinal axis, azimuthally, or laterally to generate an image of the core sample in three dimensions;
a piston to convey the core sample enclosed in the protective canister through a passageway within the coring tool; and
a calibration plug affixed to a bottom of the protective canister to move through the passageway between the X-ray generator and the X-ray detector as the piston advances, wherein the calibration plug does not comprise core samples from the geological formation.

* * * * *